Aug. 3, 1948.　　　W. E. TAIT ET AL　　　2,446,200
COATING SHUTTER AND LENS COMBINATION
FOR CAMERA FILM HOLDERS
Filed Oct. 25, 1946　　　　　　　　3 Sheets-Sheet 1
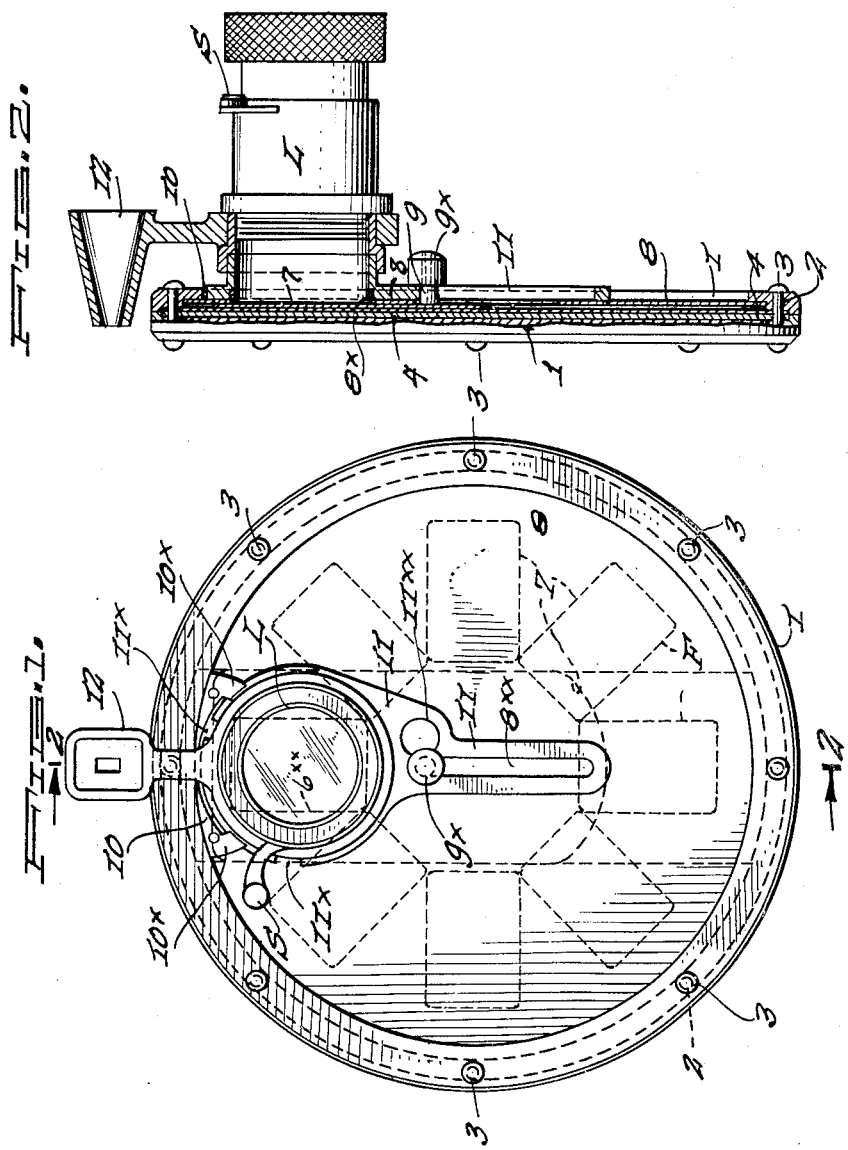
INVENTOR.
Wilfred E. Tait and
BY August W. Stelepflug
H. Lee Helms
ATTORNEY.

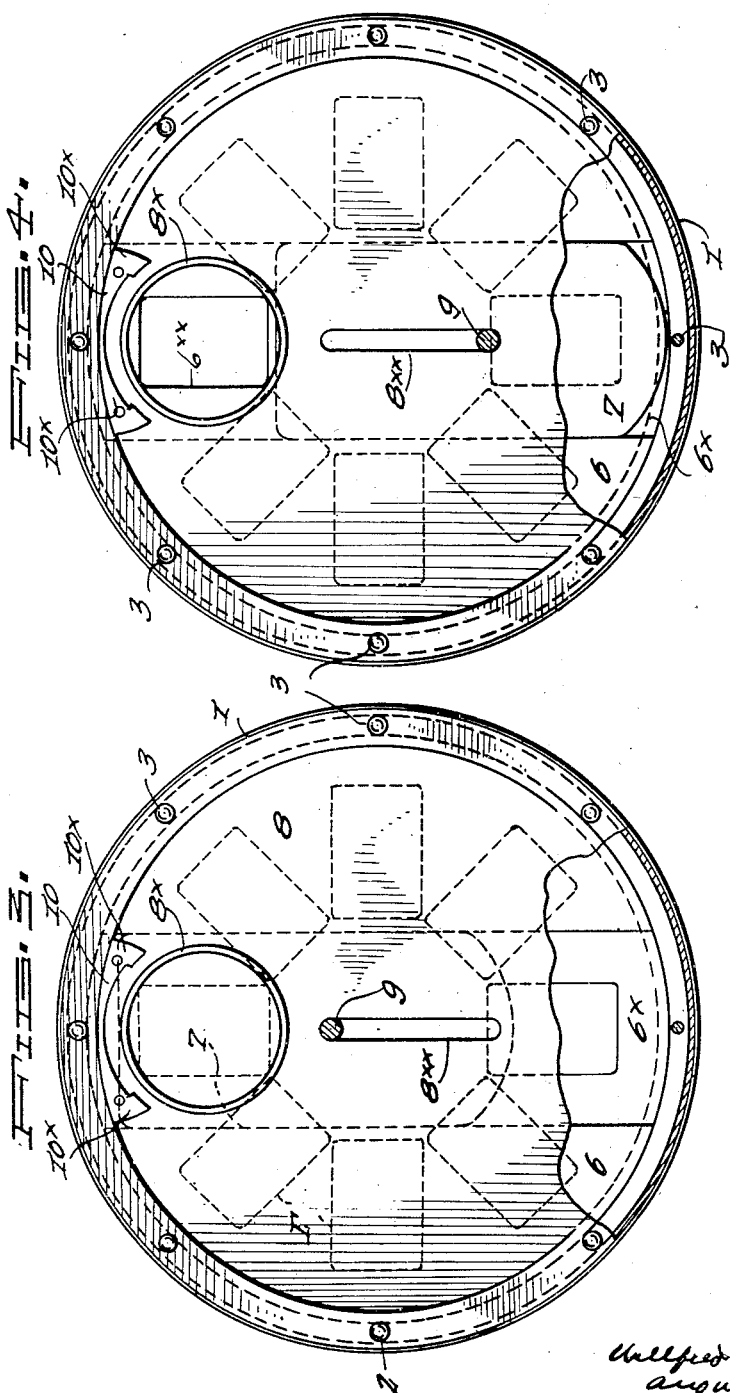

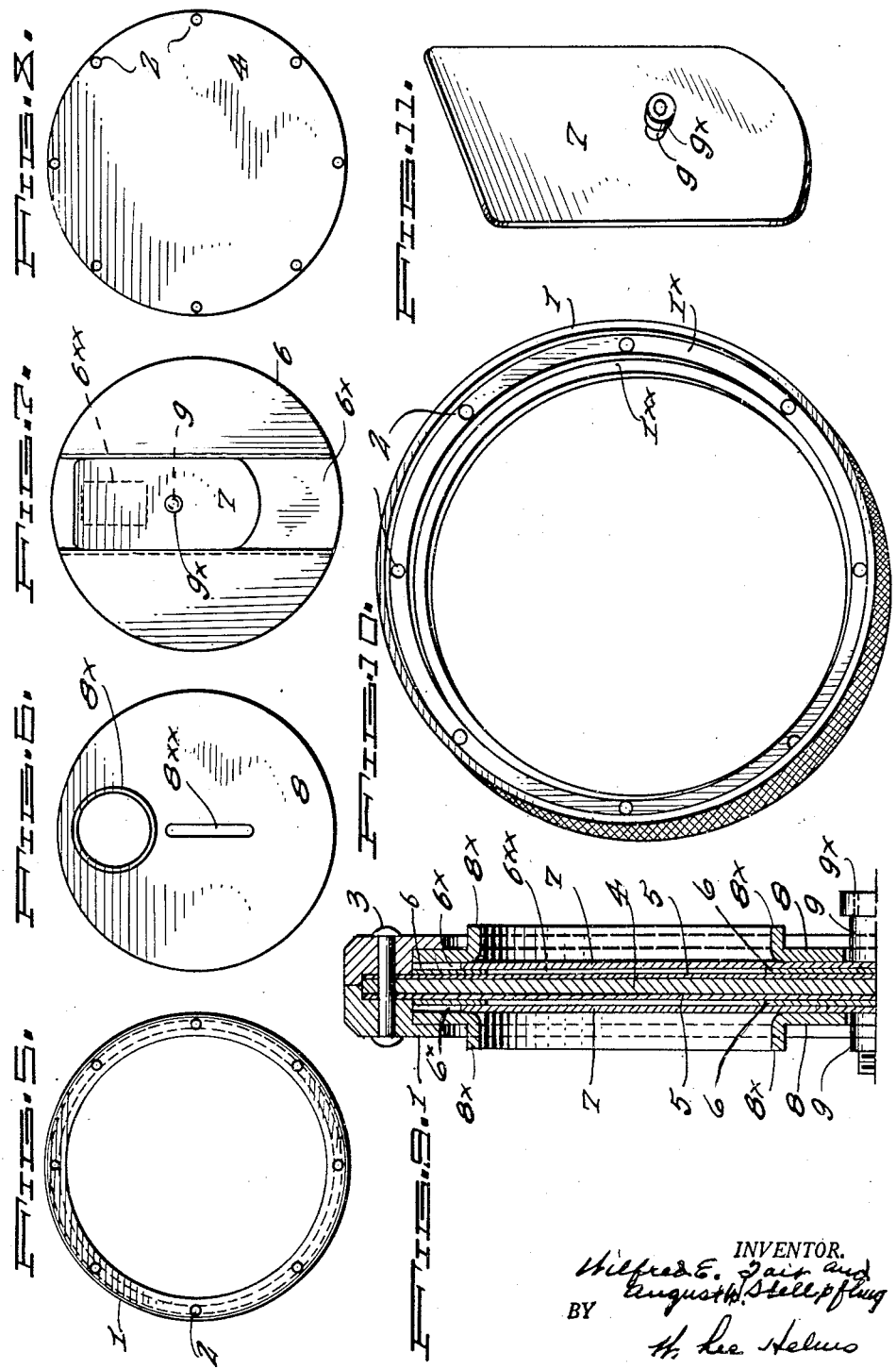

Patented Aug. 3, 1948

2,446,200

UNITED STATES PATENT OFFICE 2,446,200

COACTING SHUTTER AND LENS COMBINATION FOR CAMERA FILM HOLDERS

Wilfred E. Tait, Westport, and August W. Stellpflug, Weston, Conn., assignors to American Safety Razor Corporation, Brooklyn, N. Y.

Application October 25, 1946, Serial No. 705,502

4 Claims. (Cl. 95—37)

The object of the present invention is to provide a camera which will consist of a film containing casing which is quite shallow and light in construction, which casing has an image opening controlled by a shutter slide, in combination with a lens mounting which is detachable, and which is so controlled by the shutter slide that the lens mounting cannot be removed from the casing until the shutter slide is in closed position. Also the lens mounting cannot be securely latched in position without moving the shutter slide to open position. This construction insures that the image aperture of the casing will be open when the lens mounting is attached and latched in position, and it also insures that the image opening will be closed prior to detaching the lens mounting from the casing.

The above factors are very important when it is considered that the casing will be employed as a mailing holder for the exposed film, and the lens with its mounting will be detached from the casing when the cycle or cycles of exposures have been made. The lens mounting and the lens will then be attached to a like casing containing a fresh film, so that the assembly will be ready for immediate use.

A further feature of the invention is such construction of the casing that two sensitized films may be carried thereby, and when one film is exposed with a plurality of concentric images, the lens holder with its lens may be reversed in position for like exposure of the second film.

The above and other features of the invention will be described with reference to the accompanying drawings, in which:

Figure 1 is a plan view showing the front face of an embodiment of the invention with the lens holder and a lens mounting in position preliminary to latching the same in position and automatically opening the casing shutter;

Figure 2 is a transverse section on the line 2—2, Figure 1;

Figure 3 is a view similar to Figure 1 with the lens holder and mounting removed, the structure being partly broken away and the casing shutter being in closed position;

Figure 4 is a view similar to Figure 3 with the casing shutter in open position;

Figure 5 is a rear view of the structure shown in Figure 1 when only one sensitized film is carried thereby;

Figure 6 is a plan view of the front plate;

Figure 7 is a plan view of the image aperture plate with the casing shutter held thereby;

Figure 8 is a plan view of the baffle plate;

Figure 9 is a fragmentary transverse section showing my preferred arrangement in which the baffle plate is used as a separator for an assembly of image aperture plate with its casing shutter, and the front plate, at each side of the baffle plate, two sensitized films being employed;

Figure 10 is a perspective view of one of the casing rings;

Figure 11 is a perspective view of the casing shutter.

Referring to Figures 9 and 10, it will be seen that the casing rings, which hold the other elements in position, consist of two members having peripheral abutting faces at 1, inwardly of said faces 1 each ring being cut to form a recess 1x and a second and deeper recess at 1xx. The rings are provided with registering apertures 2 adapted to receive light rivets, preferably hollow rivets, as indicated at 3, for holding the rings together with the members carried thereby.

Centrally disposed between the rings is a baffle plate 4 which is formed with apertures for the passage of the rivets 3. At one side of the baffle plate may be placed the sensitized film 5 which is immediately faced by a shutter plate 6. This plate may have a depressed channel at 6x so that the walls of the channel will afford a guide for a casing shutter 7 adapted to be moved into and out of position to close or open an image aperture 6xx in plate 6.

Outermost of plate 6 is a plate 8 having an image aperture surrounded by a ring formation at 8x. Carried by casing shutter 7 is a stud 9 which projects through a slot 8xx in plate 8. The stud may have threaded thereon a button or a head 9x.

Rivetted or otherwise secured to plate 8 is a latch clip 10 having at its ends spring fingers 10x. Fitted upon the ring formation or short neck 8x of outer plate 8 is a latch member 11 which may directly carry or be carried by the lens mounting L. To this end the upper portion of latch member 11 is a ring having an outer flat face cut away at spaced points as indicated at 11x so that when the ring is mounted on the neck of plate 8 in a given position the latch fingers 10x will be cleared by the apertures, and thereafter a short rotational movement of latch member 11 will bring the walls of the ring under the latch fingers.

The head 9x of stud 9 carried by the casing shutter can be passed through an opening at 11xx in the latch member 11 whilst the slots 11x are in register with the spring ends of latch clip 10. It will be seen by reference to Figure 1 that thereupon a short movement of latch member 11 to the right will carry the stud head 9x out of opening 11xx and into register with a narrow elongated opening. The button head 9x may then be pressed downwardly by the fingers of operator's hand to securely hold latch member 11 against such lateral and rotational movement as to free the device from plate 8 through re-registration of the slots 11x with the fingers 10x of the latch clip 10. This downward movement of stud 9 and its head 9x will carry casing shutter 7 downwardly to expose both the image opening 8x in plate 8 and the image aperture 6xx of plate 6.

By supporting the lens mounting L in one hand and operating the shutter S, shown at Figure 2, after successively rotating the casing to successive image frame positions, the image frames being indicated at F, the sensitized areas of said frames will be exposed. In this connection we have arranged the rivets 3 so that they may be used as registration indicators for the successive frames employing the shank of the finder 12 as a co-acting indicator. Successive numbers may be placed around the casing to act as numeral designations for the frame areas.

As will be seen by reference to Figure 9, the plates 6 and 8, the former with its casing shutter 7, may be duplicated, and there will be a like assembly at each side of the baffle plate 4. Thus, when the operator has exposed all of the frames of the film sheet 5 at one side of the casing, the button 9x may be pushed up to the position of Figure 1, a slight turning movement then given to latch member 11 to carry the button into the opening 11xx, and this movement will bring apertures 11x into registration with the spring fingers 10x so that the latch member 11 with the lens mounting L associated therewith can be removed from plate 6 and immediately applied to the like plate at the opposite side of the casing for latching, the opening of casing shutter 7 and the successive exposure of the frames on the second sensitized sheet 5.

When the second sensitized sheet has been exposed, the removal of the lens mounting with its contained lens insures that the appropriate casing shutter is moved to closed position, because that shutter is operated only by an essential element of the latch, it being the primary latch releasing member, i. e., the stud 9 with its head or finger button 9x.

The use of light, and preferably hollow or tubular rivets 3, for holding the two casing rings together is desirable, because it is primarily intended that the casing be employed as a mailing box for the exposed film and for the returned unit containing sensitized film for re-use. Thus after the sensitized sheet or sheets have been exposed and the lens mounting with the latch member 11 removed, the casing with its exposed film may be mailed or otherwise delivered to a processor, whereas the lens mounting and latch member will be the same by the initial user. The processor can mail or otherwise deliver to the user prints of the exposed pictures, which prints may be enlarged according to present practice, together with such additional loaded casings as desired. When the processor receives the casing with the exposed film, all of the rivets may be removed simultaneously by the simultaneous action of punch pins arranged annularly on the punch press whereupon the film sheet or sheets may be developed in the usual manner and the casing and its plates reassembled with fresh film and rivetted for re-use.

It will be understood that various modifications may be made in the form and arrangement of the elements constituting the embodiment illustrated in the drawings, without departure from the spirit of the invention. In practice the casing and plates will be made of very light material. When metal is used, as magnesium or aluminum, for the casing and plates, it will result in an assembly weighing only a few ounces, and suitable plastic, which is readily available, may be used with like result.

Having thus described our invention, what we claim and desire to secure by Letters Patent is as follows:

1. A camera consisting of a casing adapted to hold sensitized film, an overlying plate formed with an image aperture, a shutter for said image aperture, a lens mounting adapted to be held in register with said image aperture, and holding means for said lens mounting including an extension of the lens mounting formed with an elongated slot merging into a lateral aperture, and a stud carried by the shutter slide and adapted to be passed through said lateral aperture and thence to be moved in said elongated slot to carry the shutter slide to image opening position.

2. A camera consisting of a casing comprising separable members and means for holding the members connected, a plate held by the casing and formed with an image aperture, a movable shutter for said image aperture, a lens mounting and means for holding the latter in register with said image aperture, said means including a finger, an apertured wall carried by the lens mounting and through which apertured wall the finger is adapted to pass, a stud carried by the shutter slide, a second aperture in said wall for receiving the stud and merging into an elongated aperture, whereby the movement of said wall onto the stud will enable the wall to be given a rotational movement to effect holding action of said finger on the wall and registration of the stud with the elongated aperture, permitting opening of the shutter by movement of the stud within said elongated aperture, the position of the stud thus moved holding the lens mounting against rotational movement and detachment from the camera.

3. A camera consisting of a casing comprising separable members and means for holding the members connected, a central film supporting plate carried by the casing, a shutter guide plate and a sliding shutter carried at each face of the central plate, a cover plate at each side of the central plate, each cover plate having an image aperture and an elongated slot, a stud carried by each shutter slide and passing through said elongated slot, a lens mounting adapted to be placed in register with the image aperture of the cover plate at either face of the casing, said lens mounting having as an element an extension provided with an aperture to receive said stud, said aperture merging into an elongated aperture, as and for the purpose set forth.

4. A camera constructed in accordance with claim 3 in which the lens mounting extension is provided with an annular portion surrounding the image aperture of the cover plate, a clip carried by the assembly independently of the lens mounting and having a latch finger, an aperture being formed in the lens mounting extension through which said latch finger may pass, whereby when the stud receiving aperture of the lens mounting extension receives the stud, said lens mounting extension may be moved to simultaneously register the stud with the elongated aperture and to move an area of the annular portion of the extension under the latch finger, movement of the stud in said elongated aperture serving to latch the lens mounting against rotational movement.

WILFRED E. TAIT.
AUGUST W. STELLPFLUG.

REFERENCES CITED

The following references are of record in the file of this patent:

UNITED STATES PATENTS

| Number | Name | Date |
| --- | --- | --- |
| 1,127,539 | Stern | Feb. 9, 1915 |
| 2,188,974 | Dilks | Feb. 6, 1940 |